United States Patent Office 3,605,522
Patented Sept. 20, 1971

3,605,522
DRIVE UNITS
Albert Grosseau, Chaville, France, assignor to Societe Anonyme Automobiles Citroen, Paris, France
Filed Nov. 22, 1968, Ser. No. 778,259
Claims priority, application France, Nov. 22, 1967, 129,258
Int. Cl. F02b 33/00; F16h 37/00
U.S. Cl. 74—689                                              5 Claims

ABSTRACT OF THE DISCLOSURE

The present invention relates to drive units and according thereto such a unit comprises a two-stroke engine having a scavenging compressor, a speed regulator and a differential gear. One of the elements of the differential is coupled to a shaft of the compressor, a second of these elements is coupled to the output shaft of the engine and the third one of these elements is fixed to an input shaft of the speed regulator. The speed regulator may take the form of a hydrokinetic torque converter or it may be electrical or mechanical, in which latter case, it can conveniently comprise a pair of variable diameter pulleys interconnected by belt means.

---

Figure 1:
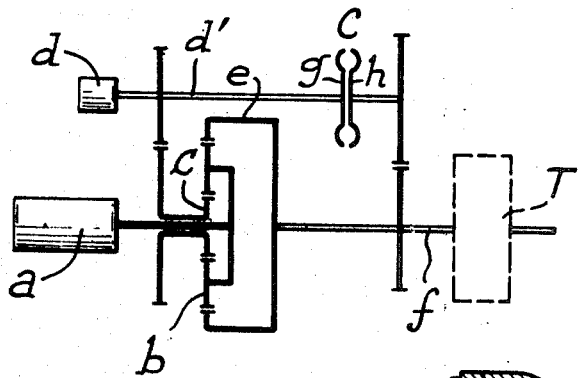

The present invention relates to a device for rotating a scavenging air compressor by a two-stroke engine with which it is associated.

It is known, for the differential supercharging of four-stroke engines, to drive the supercharger compressor through an epicyclic differential gearing, one of whose elements, generally the satellite holder, is coupled to the output shaft of the engine. The power of the drive shaft may be transmitted to a driven device, for example, a vehicle, by means of a variable speed power transmission such as a torque converter whose pump element may be coupled to the satellite holder of the differential train, and the turbine element to the crown wheel thereof.

One concept upon which the present invention is based is driving a scavenging compressor fitted to a two-stroke engine through differential gearing. However, it was very quickly realised that this application presented difficulties due to the differences between the supercharging of a four-stroke engine and the scavenging of a two-stroke engine. Before explaining the invention, the characteristics of these two types of engines and the problems which must be solved will first be explained.

In fact, in a four-stroke engine, the compressor discharges into a closed volume at a pressure which is as high as it is desired to increase the rate of supercharge; in a two-stroke engine, on the contrary, the compressor circulates air or a gaseous mixture through the engine, from the inlet port to the exhaust port with a flow which is as high as it is desired to increase the rate of scavenging. The operation of the compressor is thus different particularly at low speeds of the engine; in the first case (four-stroke engine), the compressor yield, at high pressure, is small, whereas in the second case (two-stroke engine), the yield is high at low pressure, with the risk of racing (non-existent in a four-stroke engine), this, in practice, leading to the use, in two-stroke engines, of a blower instead of a compressor proper.

If, therefore, one attempts to drive a compressor for a two-stroke engine through differential gearing, by means of the assembly referred to above and which has already been proposed for supercharging four-stroke engines, various disadvantages appear.

In the first place, an increase in the scavenging brings about a greater increase of the torque at low speeds than at high speed with respect to the conventional solutions of pre-compression in the housing. If, therefore, the drive of the scavenging compressor by the differential is well adapted to average speed for example, an excessive scavenging for the low speeds and a break-down of power at high speeds are brought about.

On the other hand, if the two-stroke engine is coupled to a driven device having an inertia greater than that of the engine (for example a vehicle), it is practically impossible to use the engine as a brake. As the driven device (the vehicle) momentarily drives the engine, the torques on the differential gearing and thus also on the compressor are reversed, and the two-stroke engine may stop. In fact, it does not operate, as does a four-stroke engine, like a pump compared with the compressor and thus the latter could stop and then reverse.

In the circumstances, the invention aims at maintaining substantially constant, whatever the speed of rotation of the engine, the torque supplied to the scavenging compressor for a given load of the engine.

To this end, it effects a small transfer of power, for example of 10%, and thus a torque transfer between the shaft of the compressor (or the element of the differential to which the compressor is coupled) and the drive shaft or driven device, or possibly both. In the case where the driven device is a vehicle whose wheels are driven by a variable speed power transmission, it must, however, be understood that "driven shaft" designates the input shaft of the power transmission.

The invention thus has for an object a drive unit for driving a driven device, such as a vehicle, such unit comprising a two-stroke engine provided with a scavenging compressor and, preferably, a variable speed power transmission, for example a hydrokinetic converter which connects it to the receiver. In addition, there is provided on the one hand epicyclic differential gearing, one of whose elements, preferably the planet, is coupled to the shaft of the compressor, another element of which, preferably the satellite holder, is coupled to the output shaft of the engine, and the third element of which, preferably the crown wheel, is coupled to the driven shaft; on the other hand, at least one speed regulator which is preferably reversible, such as for example a hydrokinetic torque converter, one of whose input and output members is coupled to the shaft of the compressor, whilst the other is coupled either to the drive shaft or to the driven shaft.

The invention thus constitutes a novel application of the similar devices which have already been used for driving supercharger compressors for four-stroke engines. When it is used on a vehicle, it also constitutes an original combination which enables the requirements of two-stroke engines comprising a scavenging compressor to be satisfied, as will be shown.

Figure 2:
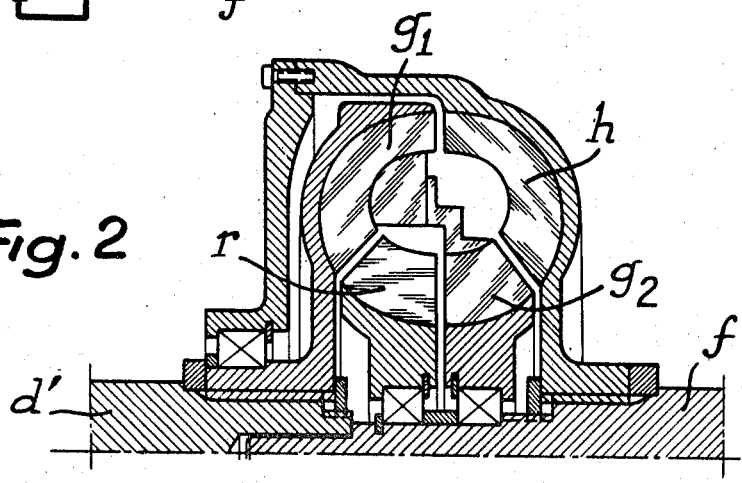
Figure 3:
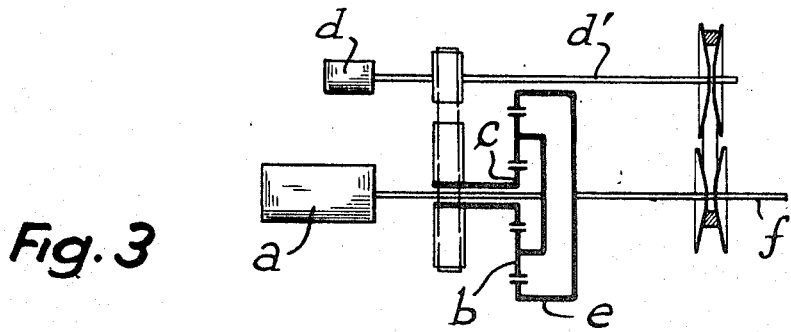

The invention will in fact be more readily understood and various secondary characteristics as well as the advantages will appear during the following description of a few embodiments given solely by way of example. To this end, reference will be made to the accompanying drawings, in which:

FIG. 1 shows a diagram of a device according to the invention in which the speed regulator is an hydraulic torque converter, FIG. 2 shows schematically a particularly converter enabling the invention to be produced, and FIG. 3 shows a diagram, similar to FIG. 1, of an embodiment in which a mechanical system is used for effecting the power transfer.

Referring to FIG. 1, a two-stroke heat engine $a$ drives the satellite holder element $b$ of an epicyclic gear whose planet $c$ drives a scavenging compressor $d$, the toothed crown wheel $e$ of said gear driving a driven shaft $f$.

The compressor shaft $d'$ drives on the other hand one of the elements, for example the pump element $g$ of a hydrodynamic converter C whose turbine element $h$ is coupled to the driven shaft $f$.

If this is necessary, for reasons for simplicity of instruction and of overall size, or due to the speeds of the various apparatus, the connections between differential, compressor, engine and receiver shaft may be effected by gear trains or alternatively may be direct.

It must also be pointed out that the convention of the element $h$ of the converter C to the driven shaft $f$ could be replaced by a connection to the output shaft of the engine $a$.

In addition, it must be emphasized that, in the case where the engine drives the wheels of a vehicle, a variable speed power transmission, such as for example a hydrodynamic converter or a gear box, shown schematically in dashed lines at T, will be driven by the driven shaft $f$, this latter then constituting the input shaft of this transmission.

Referring more particularly to FIG. 2, the converter C (constituting what was called above the speed regulator) is of the type having two turbines $g_1$ and $g_2$, connected to rotate together and keyed, as has just been said, to one or the other of the shafts $d'$ and $f$. A pump $h$ is fixed to the other of these two shafts and a reaction element $r$, disposed between the two turbines, is fixed to the framework of the apparatus or on the contrary, it is keyed to the shaft of the pump by means of a free wheel.

These arrangements are particularly advantageous in the case where it is desired to have a generator of substantially constant power over a wide range of speeds; the power of the engine is almost proportional to the speed of the compressor, with a two-stroke engine, for the low scavenging rates currently allowed. It is, therefore, necessary that this latter rotates at substantially constant speed.

This result is obtained due to the fact that the converter C is reversible and may derive from or, conversely, transmit to the shaft $d'$ of the compressor a certain fraction of the torque supplied thereto by the planet $c$ of the differential train. This removal or addition is restored to (or removed from) the driven shaft with the exception of the output from the converter C.

The converter C shown in FIG. 2 is more particularly suitable due to its substantially linear "power transmitted as a function of slip" characteristic.

In general, the compressor $d$ will be dimensioned for a particular operation of the engine $a$, viz. maximum, minimum or average speed. For this particular speed, the converter C will neither transmit nor derive any torque to or from the shaft $d'$ of the compressor. On the other hand, above or below this speed, the torque (or power) transfer will be automatically effected in the suitable sense, as has just been said.

The converter will therefore act reversibly in the case where the dimensioning of the compressors $d$ corresponds to an average speed of the engine $a$. If the dimensioning of the compressor corresponds on the contrary to the maximum or minimum speed of the engine, the converter may be designed solely for the purpose of a unilateral operation in the suitable direction.

It must be observed here that the speed regulator C may connect the shaft $d'$ of the compressor and the drive shaft instead of the driven shaft.

Similarly, a second speed regulator (possibly of the same type as the converter C) could connect the shaft of the compressor and the drive shaft. In this latter case, the transfer of power would be effected simultaneously between the shaft of the compressor and the two drive and driven shafts.

It may also be said that, starting with a given equilibrium, if a slight torque increase is given to the shaft of the compressor, the latter will increase in speed, will thus increase the scavenging of the engine which in its turn will supply thereto a supplementary torque, so that a new equilibrium is obtained which differs from the earlier one.

Moreover, when using the engine as a brake, a certain torque is always transmitted to the compressor by the converter C so that there is no risk of the operation of the compressor stopping or changing its direction.

Of course, as has already been taken into account, another type of speed regulator could be used for ensuring the transfer of power and/or torque, which regulator may or may not be reversible, for example, a regulator or electrical converter of a known type. However, FIG. 3 shows another embodiment of the arrangement of FIG. 1 in which the hydrodynamic speed regulator C is replaced by a belt-driven speed regulator $l$ of any conventional type, one of those variable-diameter pulleys is directly coupled to the shaft $d'$ of the compressor $d$ and the other pulley of which is fixed to the driven shaft $f$.

This latter embodiment operates in the same way as that described with reference to FIGS. 1 and 2.

I claim:
1. A drive unit for driving a load comprising a two-stroke engine provided with a scavenging compressor, a variable speed power transmission connecting said two-stroke engine to the said load and a three-element epicyclic differential gear, a first one of said elements of the epicyclic gear being coupled to the shaft of said scavenging compressor, a second one of said elements being coupled to the output shaft of said two-stroke engine and the third one of said elements being fixed to the input shaft of said variable speed power transmission, at least one reversible variable speed power transmission for maintaining a substantially constant torque on the shaft of said scavenging compressor having input and output members, one of which members is coupled to said shaft of said compressor and the other member being coupled to the output shaft of said engine.

2. A drive unit according to claim 1 wherein said reversible variable speed power transmission is a hydrokinetic torque converter.

3. A drive unit according to claim 2 wherein said hydrokinetic torque converter comprises two turbines between which a reaction element is disposed.

4. A drive unit according to claim 1 wherein said reversible variable speed power transmission is of the mechanical type.

5. A drive unit according to claim 4 wherein said mechanical type reversible variable speed power transmission comprises a pair of variable diameter pulleys interconnected by belt means.

References Cited
UNITED STATES PATENTS

| | | | |
|---|---|---|---|
| 3,296,791 | 1/1967 | Richard et al. | 60—19 |
| 3,349,759 | 10/1967 | De Coye de Castelet | 123—119(C) |
| 3,362,259 | 1/1968 | Hayward | 74—688 |

FOREIGN PATENTS

| | | | |
|---|---|---|---|
| 754,170 | 2/1938 | Germany | 123—119(C) |

LEONARD H. GERIN, Primary Examiner

U.S. Cl. XR.

123—119